No. 641,002. Patented Jan. 9, 1900.
R. C. DRINKER.
APPARATUS FOR MEASURING INTENSITY OF LIGHT.
(Application filed Dec. 3, 1898.)
(No Model.)
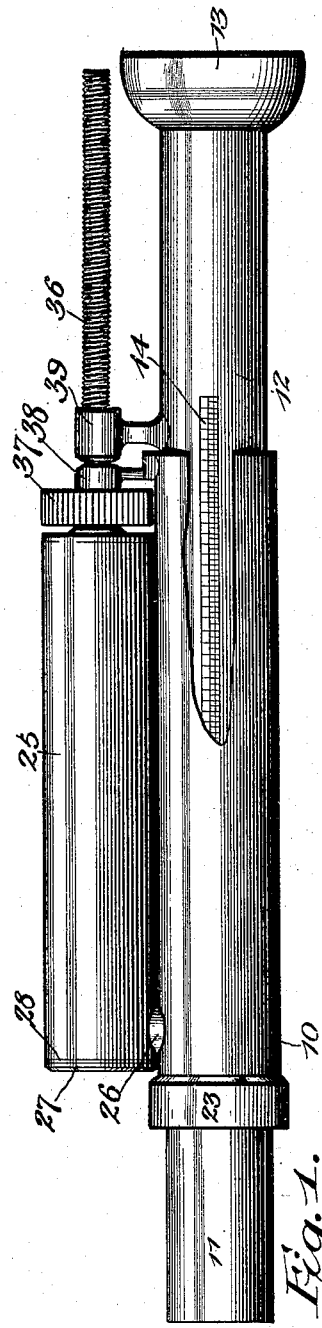
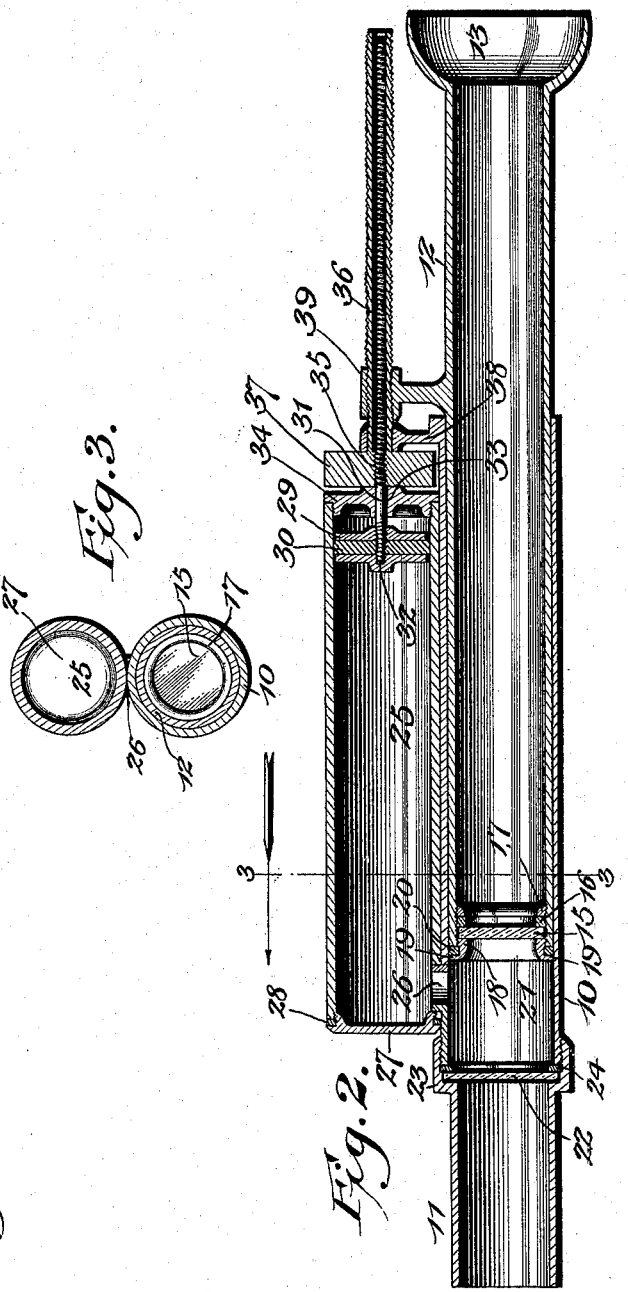
Witnesses
Richard C. Drinker, Inventor.
By his Attorneys,

UNITED STATES PATENT OFFICE.

RICHARD C. DRINKER, OF SOUTH BETHLEHEM, PENNSYLVANIA.

APPARATUS FOR MEASURING INTENSITY OF LIGHT.

SPECIFICATION forming part of Letters Patent No. 641,002, dated January 9, 1900.

Application filed December 3, 1898. Serial No. 698,179. (No model.)

*To all whom it may concern:*

Be it known that I, RICHARD C. DRINKER, a citizen of the United States, residing at South Bethlehem, in the county of Northampton and State of Pennsylvania, have invented a new and useful Apparatus for Measuring the Intensity of Light, of which the following is a specification.

My invention relates to a method of and apparatus for measuring the intensity of rays of light from a selected source and also, incidentally, for determining the degree of heat of a solid substance by the intensity of the light-rays emitted thereby.

In the art of photography it frequently becomes necessary to measure the intensity of rays of light in order to determine the efficiency thereof for the performance of a given function, and in order that this intensity may be ascertained with sufficient accuracy I have devised a photometer consisting of an apparatus having a movable or adjustable member scaled to indicate comparative or absolute degrees of light by reference to a known or assumed unit, such as a lux, and in carrying out my invention I proceed by interposing between the eye of the observer and the source of light a light-obstructing medium which is variable as to depth and increase the depth or thickness of such medium until the light is intercepted, and obviously by establishing a relation between the thickness of the medium and the unit of light, such as a lux, I am enabled to determine by the thickness the number of units of light emitted by the named source, and thus to ascertain the relative efficiencies of different lights in connection with photography and like arts. Having ascertained that a certain thickness or layer or depth of any particular liquid in a receptacle will obstruct or cut out a ray of light of a certain intensity or that a layer of liquid of a certain thickness or depth will cut out, for instance, a ray of light of a strength known as a "lux," it is obvious that a depth or thickness of liquid which is equal to two or more times the first-mentioned layer will cut out a light of an intensity which is correspondingly greater than that which is referred to as a "lux," and therefore for convenience of description I refer to the depth of the light-obstructing fluid or the distance through which a ray of light must travel therein as the "layer thickness" of said medium and also refer to the receptacle which contains the light-obstructing medium as the "layer-receptacle." The imaginary layers of light-obstructing fluid are supposed to cut out a corresponding number of units of light.

Further objects and advantages of this invention will appear in the following description, and the novel features thereof will be particularly pointed out in the appended claims.

In the drawings, Figure 1 is a side view of a measuring instrument constructed in accordance with my invention. Fig. 2 is a longitudinal section of the same. Fig. 3 is a transverse section on the plane indicated by the line 3 3 of Fig. 2.

Similar reference characters indicate corresponding parts in all the figures of the drawings.

The instrument embodying my invention is provided with a cylinder 10, fitted with an axially-alined object-tube 11, and fitted to slide in the cylinder is an observation-tube 12, having its outer end flared and of suitable contour to form an observation-opening 13 to enable the observer to apply his eye and exclude light from the tube at that end. It will be understood that other means for excluding side light may be employed, but that the means described is simple and is adequate in the ordinary uses of the instrument. The observation-tube is scaled, as shown at 14, or is provided with a series of graduations, referring to any suitable unit of measure and adapted, in connection with any fixed pointer, such as the adjacent end of the cylinder, to indicate by extensions of the observation-tube relative to the cylinder different degrees of intensity of light, as will be hereinafter more fully explained. The observation-tube at its inner or front end carries a lens 15, seated upon a yielding bed or packing-ring 16, which is interposed between the lens and a shoulder 17, threaded or otherwise secured in the bore of the observation-tube, and the lens is held in place in contact with this packing-ring by a collar 18, also threaded in the end of the observation-tube and provided with a rim or flange 19, between which and the end of the observation-tube is arranged a packing-ring 20. The packing-rings 16 and 20 are designed to exclude from the observation-tube moisture contained in the front end of the cylinder from passing into the observation-tube. Obviously the lens is movable with the observation-tube and forms a transparent light-transmitting or light-penetrable medium interposed between a chamber 21 in the front end of the cylinder 10 and the portion of the cylinder in rear of said medium. The outer or front wall of this chamber 21 is formed by a second preferably stationary transparent light-transmitting or light-penetrable medium consisting of a lens 22, which is held in place by a cap 23 on the adjacent end of the object-tube 11, a suitable packing-ring 24 being interposed between the periphery of the lens and the adjacent end of the cylinder to exclude moisture within the chamber 21 from the interior of the object-tube.

The chamber 21, of which the opposite terminal walls are formed by the above-described movable and fixed light-penetrable mediums, is adapted for the reception of a layer of light-obscuring fluid, preferably liquid, of a known and homogeneous density or turbidity, and as in practice the chamber 21 or layer-receptacle will be permanently filled with the obscuring-fluid it will be understood that the extent to which the light-rays will be absorbed by the fluid interposed between the lenses will depend upon the depth or thickness of the layer, or, as I will hereinafter term it, the "layer thickness," and that this layer thickness will depend upon the length of the path of light in passing through the receptacle from the fixed medium to the movable medium.

To maintain a permanent supply of obscuring fluid to insure a fully-charged condition of the layer-receptacle at all adjustments of the movable lens or plunger, I have illustrated in the drawings a preferred construction embodying a reservoir 25, which may be arranged parallel with and adjacent to the barrel or cylinder 10 and which communicates therewith adjacent to one end by a port or conveyer 26. This reservoir is fitted at one end with a removable cap 27, between which and the end of the reservoir may be interposed a packing-ring 28, and mounted for reciprocatory movement in the reservoir is a plunger 29, having a packing-ring 30 or the equivalent thereof, the rod 31 of the plunger being attached to the latter in any suitable manner, as by a right-hand screw-thread 32, and extending axially through a guide-opening 33 in the reservoir-head 34.

The body portion of the rod 31 is provided with a left-hand screw-thread 35 to constitute a feed-screw, and concentric therewith is arranged an outer exteriorly-threaded tubular feed-screw 36. The outer feed-screw consists of the hub extension of a feed-nut 37, which is interposed between the reservoir-head 34 and a fixed standard 38, whereby the nut is free to rotate, while being held from axial movement. The tubular feed-screw 36 extends through and has a smooth journal portion mounted for revoluble movement in a suitable bearing on said standard. The threads of the tubular feed-screw 36 are of a pitch opposite to the inner feed-screw 35 (or right hand) and engage a pedestal feed-nut 39, attached to the observation-tube 12, and hence operatively connected by said tube with the light-penetrable medium formed by the adjustable lens 15.

The relation between the parts, as described, is such that when the layer-receptacle and reservoir are completely filled with a suitable light-obscuring fluid, such as a colored liquid, the movement of the feed-nut 37 will cause a linear movement in opposite directions of the plunger and movable light-transmitting lens operating, respectively, in the reservoir and cylinder, whereby as the lens recedes from the medium 22 to increase the depth of the layer-receptacle the plunger 29 approaches the port 26 to force the contents of the reservoir into the layer-receptacle, and as the lens approaches the medium 22 the plunger 29 recedes to allow the fluid to return to the reservoir. The diameters of the plunger and light-transmitting medium and the relative pitches of the feed-screws 35 and 36 are such that in practice the capacity of the portions of the cylinder and reservoir occupied by the light-obscuring liquid remains permanent or uniform in all positions of the plunger. Therefore by employing a scale 14 relative to the layer-thickness or the depth of the obscuring fluid in the layer-receptacle it will be understood that the operator by observing a source of light through the observation and object tubes, the line of vision being intercepted by the said layer-receptacle, may relatively adjust the parts by turning the feed-nut 37 until the light is wholly absorbed, whereupon by reference to the scale the intensity of the light thus obscured will be denoted.

The apparatus as described is also adapted for measuring or determining degrees of heat required to produce a given incandescence of a solid substance by an operation identical with that above described, the relation between the degrees of heat and the intensity of the light produced by the incandescence having been ascertained.

The lenses employed are not necessarily of absolutely clear or transparent glass, but may be opaline or otherwise adapted to interfere to a greater or less extent with the direct communication of the light, and the apparatus is preferably provided with interchangeable lenses of different degrees of penetrability.

From the above description it will be seen that the method by which I ascertain the intensity of light from a given source consists in placing in the path of rays proceeding from a source of light to an observer's eye a light-obstructing medium of a uniform density and variable thickness and adjusting the layer thickness to weaken the rays of light passing therethrough until the layer is brought to such a thickness that the rays are intercepted. By this method I am enabled to determine that with a given density of light-obstructing medium different definite layer thicknesses are necessary to intercept rays of light of different intensities.

In practice it will be understood that various changes in the form, proportion, and the minor details of construction of the apparatus may be resorted to without departing from the spirit or sacrificing any of the advantages of the invention.

Having described my invention, what I claim is—

1. A measuring apparatus having an expansible and contractible layer-receptacle adapted to receive a fluid through which a ray of light is adapted to pass, means connected with a movable member of said layer-receptacle, for varying the layer thickness within the receptacle proportionately to the expansion and contraction of the receptacle and means for placing the fluid under pressure to cause it to flow as the receptacle is expanded, substantially as specified.

2. A measuring apparatus having an expansible layer-receptacle through which a ray of light is adapted to pass, and a supply-receptacle in communication with the layer-receptacle and provided with a movable plunger for advancement simultaneously with and proportionately to the expansion of the layer-receptacle to increase the layer thickness, substantially as specified.

3. A measuring apparatus having a light-penetrable layer-receptacle of which one wall is movable, a supply-reservoir communicating with said receptacle, a plunger operating in the reservoir, and means for simultaneously advancing said plunger and movable wall in opposite directions, substantially as specified.

4. A measuring apparatus having a light-penetrable layer-receptacle of which one wall consists of an adjustable light-penetrable medium, and means for increasing the layer thickness in said receptacle, the same consisting of a reservoir having a plunger operatively connected with said light-penetrable medium, substantially as specified.

5. A measuring apparatus having a cylinder provided at one end with a seat, a light-penetrable medium fitted peripherally in said seat, an object-tube removably threaded upon the end of the cylinder to secure said medium in place, an observation-tube fitted to slide axially in the cylinder, and carrying a second light-penetrable medium, means consisting of a reservoir operatively connected with the observation-tube for supplying the space between said mediums with light-obscuring fluid and a plunger in the reservoir adapted to exert a pressure upon the fluid to cause it to flow from the reservoir to a space between said mediums, substantially as specified.

6. A measuring apparatus having a cylinder fitted with a transverse light-penetrable medium, an observation-tube mounted to slide in the cylinder and provided with an interior shoulder, a second light-penetrable medium seated upon said shoulder, a collar threaded in the observation-tube to secure said second-named medium in place, and provided with a flared flange between which and the end of the tube is arranged transversely-expansible packing, and means for supplying the interval between said mediums with light-obstructing fluid, substantially as specified.

7. A measuring apparatus having a layer-receptacle provided with walls consisting of light-penetrable mediums, one of said mediums being adjustable to vary the length of a light-ray traversing the receptacle, a reservoir communicating with the layer-receptacle, a plunger operating in said reservoir to force a light-obstructing fluid thereinto, and feeding devices for the plunger consisting of a feed-screw and feed-nut, substantially as specified.

8. A measuring apparatus having a layer-receptacle provided with walls consisting of light-penetrable mediums, one of said walls being adjustable to vary the length of a light-ray penetrating the receptacle, an adjustable observation-tube carrying said adjustable medium, means for supplying a light-obstructing-fluid receptacle, the same including a reservoir and plunger, and feeding devices operatively connected with said observation-tube and the plunger, for simultaneously moving said plunger and the adjustable receptacle-wall in opposite directions, substantially as specified.

9. A measuring apparatus having a layer-receptacle provided with light-penetrable walls, of which one is adjustable to vary the length of a light-ray traversing the receptacle, an adjustable observation-tube carrying said adjustable wall, means for supplying a light-obstructing fluid to the layer-receptacle, the same including a reservoir and a plunger, and feeding devices for said plunger and observation-tube, the same including concentric feed-screws, one of which is attached to said plunger, and the other of which engages a pedestal feed-nut on the observation-tube, and means for advancing the first-named feed-screw, and turning the other to move said pedestal feed-nut in an opposite direction, substantially as specified.

10. A measuring apparatus having a layer-receptacle provided with light-penetrable walls, of which one is adjustable to vary the length of a light-ray traversing the receptacle, an adjustable observation-tube carrying said adjustable wall, means for supplying a light-obstructing fluid to the layer-receptacle, the same including a reservoir and plunger, and feeding devices including concentric feed-screws, one of which is attached to said plunger, and the other of which engages a pedestal feed-nut on the observation-tube, and a movable feed-nut threaded upon the first-named feed-screw and carrying the second-named screw, substantially as specified.

11. A measuring apparatus having a cylinder closed at one end, the graduated observation-tube fitted in the cylinder and extending outward through the open end thereof, an interval between the inner end of the observation-tube and the adjacent end of the cylinder forming a layer-receptacle of which spaced walls consist of light-penetrable mediums, and one of said walls being carried by the observation-tube, and means for feeding light-obstructing fluid to said layer-receptacle, the same consisting of a reservoir, a plunger operating in the reservoir, and feeding devices for imparting simultaneous linear movement in opposite directions to said plunger and observation-tube, substantially as specified.

In testimony that I claim the foregoing as my own I have hereto affixed my signature in the presence of two witnesses.

RICHARD C. DRINKER.

Witnesses:
J. HARRY KRESGE,
F. H. KRESGE.